(12) United States Patent
Stensland et al.

(10) Patent No.: US 6,222,960 B1
(45) Date of Patent: Apr. 24, 2001

(54) OPTICAL ELEMENT USING MULTIMODE INTERFERENCE

(75) Inventors: Leif Stensland, Järfälla; Georges Borak, Täby; Torsten Augustsson, Upplands Väsby; Mats Granberg, Spånga, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/157,625

(22) Filed: Sep. 21, 1998

Related U.S. Application Data

(63) Continuation of application No. PCT/SE97/00511, filed on Mar. 24, 1997.

(30) Foreign Application Priority Data

Mar. 22, 1996 (SE) .................................................. 9601113

(51) Int. Cl.⁷ ................................ G02B 6/14; G02B 6/16
(52) U.S. Cl. .............................. 385/28; 385/12; 385/16; 385/123
(58) Field of Search ................................. 385/12, 15, 16, 385/27, 28, 123–126

(56) References Cited

U.S. PATENT DOCUMENTS

| | | | |
|---|---|---|---|
| 3,633,035 | * 1/1972 | Uchida et al. | 385/123 X |
| 4,087,159 | * 5/1978 | Ulrich | 385/129 |
| 4,127,320 | * 11/1978 | Li | 385/16 X |
| 4,205,901 | * 6/1980 | Ramsay et al. | 385/124 |
| 4,701,011 | * 10/1987 | Emkey et al. | 350/96.18 |
| 4,859,014 | * 8/1989 | Schmitt et al. | 385/11 |
| 5,031,989 | * 7/1991 | Morishita et al. | 350/96.15 |
| 5,796,891 | * 8/1998 | Poustie et al. | 385/28 |

FOREIGN PATENT DOCUMENTS

| | | | |
|---|---|---|---|
| 0 387 740 | 9/1990 | (EP) | G02F/1/37 |
| 60-225804 | 11/1985 | (JP) | G02B/6/14 |
| 95/12828 | 5/1995 | (WO) | G02B/6/28 |

OTHER PUBLICATIONS

Soldano, Lucas B. et al., "Optical Multi–mode Interference Devices Based on Self–Imaging: Principles and Applications", *IEEE Journal of Lightwave Technology*, pp. 615–627, 1995.

Berry, G.M. et al., "Analysis of optical rib self–imaging multimode interference (MMI) waveguide devices using the discrete spectral index method," *Chapman & Hall*, pp. 921–934 Mar. 6, 1995.

* cited by examiner

Primary Examiner—John D. Lee
(74) Attorney, Agent, or Firm—Burns, Doane, Swecker & Mathis, L.L.P.

(57) ABSTRACT

Optical elements utilize multimode interference in a piece of an optical fiber of multimode type having a core in the shape of a ring or a tubular structure. Such a fiber can be compared to a planar waveguide, the core of which has been bent about a longitudinal axis located at some distance from the core. Such an optical fiber can be optically excited having an excitation centre in a point on or at the annular core by coupling from a single-mode fiber. Then different optical propagation modes are excited having approximately regular relations between their phase velocities so that, for example, for a suitable length of the fiber piece a light intensity is obtained in the other end of the fiber piece which is an approximate reflected image of the light intensity supplied at the input end of the fiber piece. Such an optical element can, for example, be used as a filter or as a passive 1×N-coupler, where in the latter case the length of the fiber piece is adapted so that an N-fold image of the supplied light intensity is obtained at the output end of the fiber piece.

12 Claims, 5 Drawing Sheets

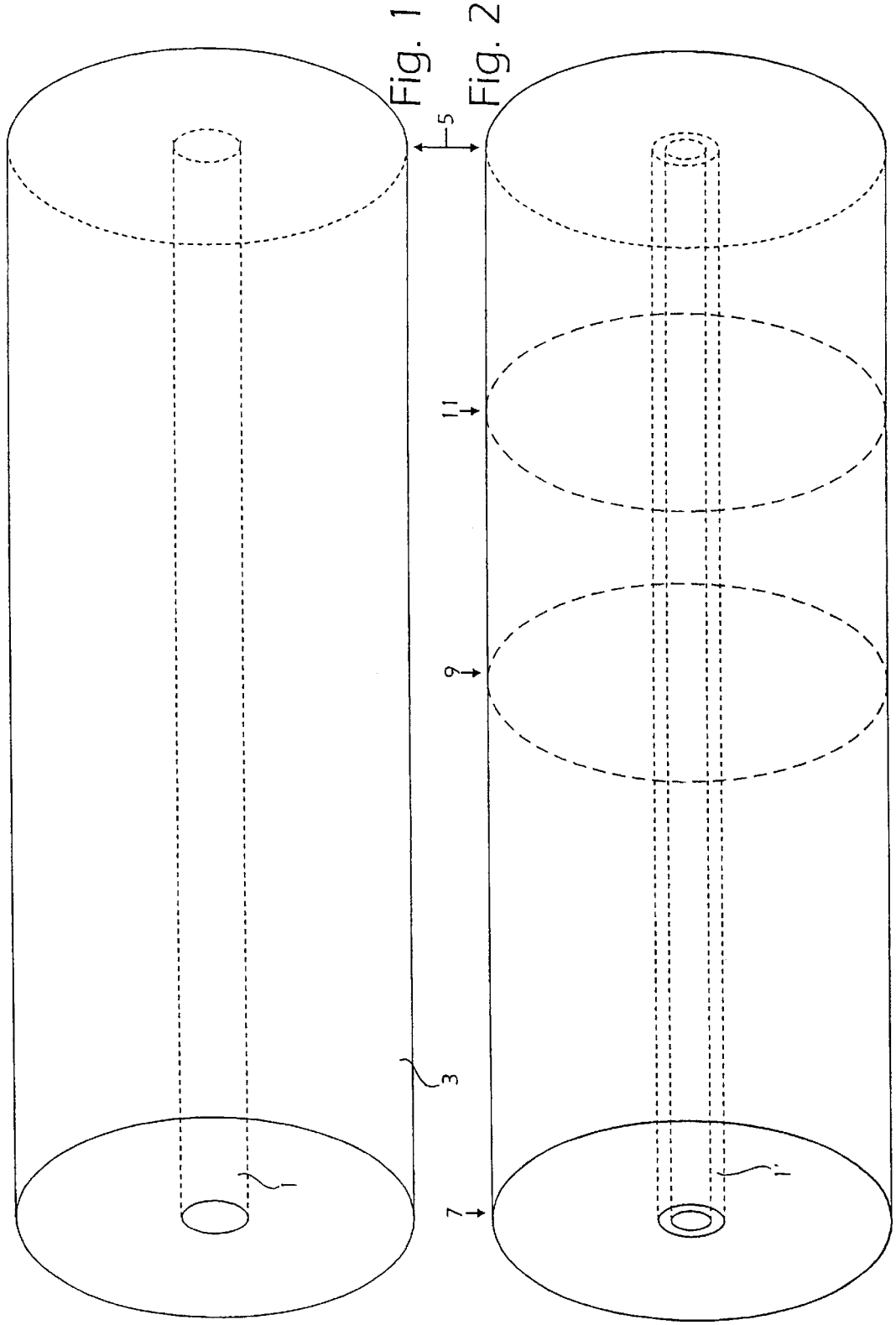

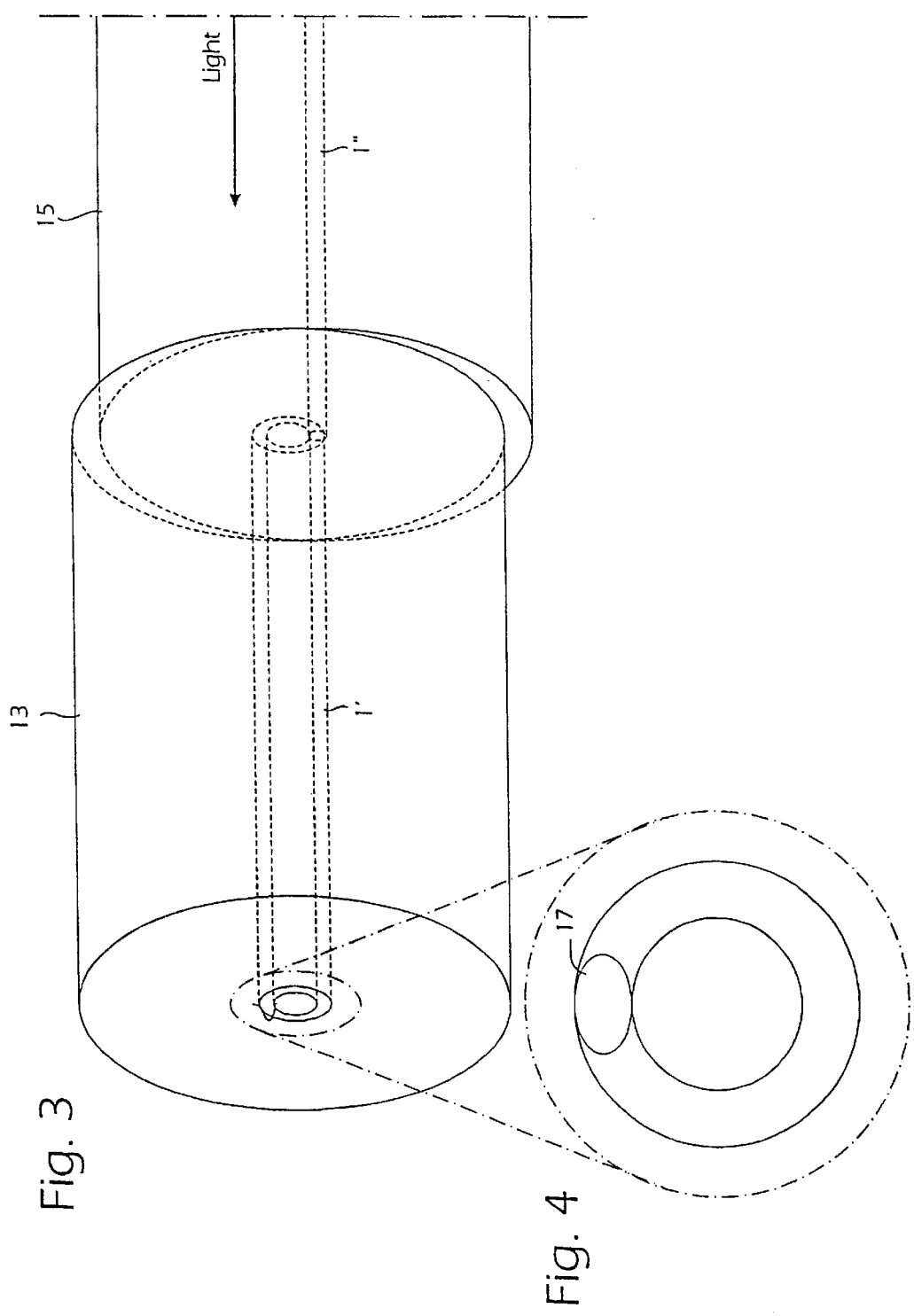

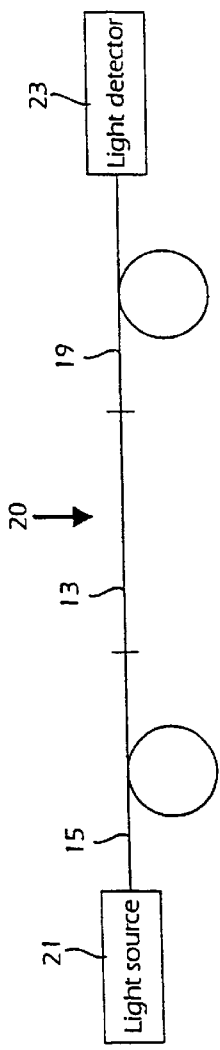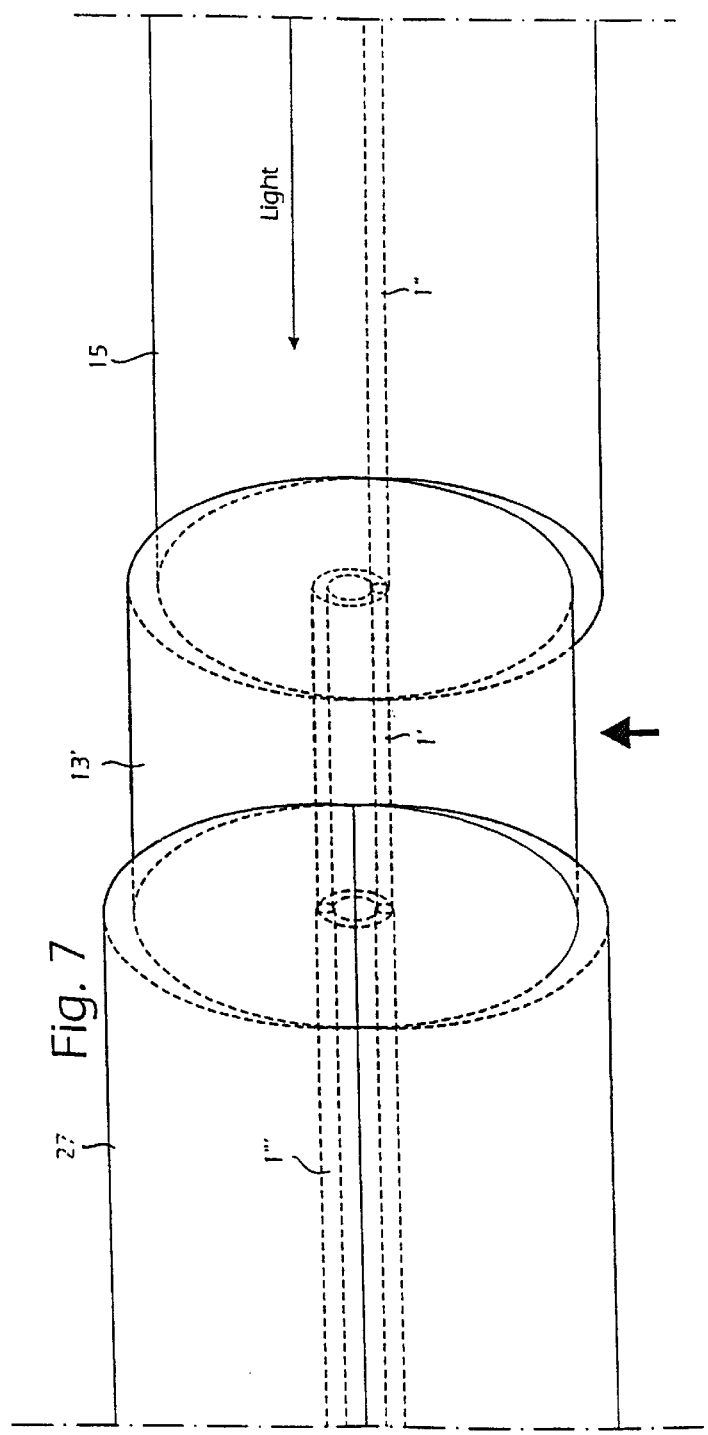

OPTICAL ELEMENT USING MULTIMODE INTERFERENCE

This application is a continuation of International Application No. PCT/SE97/00511, which was filed on Mar. 24, 1997, which designated the United States, and which is expressly incorporated here by reference.

The invention relates generally to passive optical components.

Optical communication of signals through optical fibres and other waveguides is used more and more, both locally in individual devices and in larger systems such as various types of networks for communicating information over large distances. In these devices and systems a need exists for different kinds of optical elements for performing various kinds of operations on the optical signals. An example of such elements comprises couplers for transmitting an optical signal from a single waveguide to two different waveguides. Such couplers can be based on multimode interference in planar waveguides, see e.g. the summarizing article "Optical Multimode Interference Devices Based on Self-Imaging: Principles and Applications", L. B. Soldano and E.C.M. Pennings, Journal of Lightwave Technology, vol. 13, No. 4, April 1995, pages 615–627. In these known devices a transversal multimode waveguide is excited in one point, whereby a multitude of optical or equivalently electromagnetic propagation modes are initiated. The modes propagate in the waveguide with different phase velocities and are at a cross-section of the waveguide, they are composed to an electromagnetic field distribution. Further, the field distributions differ much from each other in cross sections taken at different places along the longitudinal direction of the light waveguide. For example, one can obtain a rather exact copy of the exciting distribution, inverted distributions, multiple or multifold distributions, etc. For example, 1×N couplers have been disclosed made of GaAs and InP based waveguides for values of N between 2 and 20. A probable disadvantage of such devices is that the reflectance of the waveguide laterally can be very significant and that it can be difficult to avoid losses and/or undesired phase variations in the reflection.

In the Japanese patent application having the publication No. 60-225804 (application No. 59-083579) it is disclosed how a piece of an optical fibre 6, 6' is coupled to another fibre 4 at either side thereof, for selecting the optical mode which propagates in the fibre 4. The fibre 6, 6' has an annular core and is single-mode type, whereas the fibre 4 is common multimode type.

In said patent application and the European patent application 0 387 740 optical fibres are disclosed having annular cores. These fibres are used for transmitting light existing in the shape of a single optical mode.

SUMMARY

It is an object of the invention to provide optical elements in which multimode interference is utilized and which have a simple construction and which can be manufactured in a relatively simple way.

For the multimode interference a piece of an optical fibre of multimode type is used, i.e. an optical fibre, in which, for the intended or considered wavelengths, a multitude of optical modes can propagate simultaneously. In principle, such a multimode fibre can allow multimode interference to take place like in a planar waveguide. However, all complications owing to lateral reflectance do not exist since there are no sides or surfaces by which the can be caused. In the preferred case the multimode fibre is an optical fibre having a core which has the shape of a ring or equivalently is a tubular structure. Such a fibre can be said to be similar to a planar waveguide which has been bent around a longitudinal axis in order to form a half of a circular tube and which is then completed with another similar half of a circular tube in order to obtain a complete circular tube. The thickness of the annular core is in principle of the same magnitude of order as the thickness of the core of the corresponding planar waveguide. When such an optical fibre is excited optically, having an exciting centre located in a point at or close to the annular core, different optical propagation modes are initiated, which substantially have the same ratios of their phase velocities in relation to each other as the different modes in a corresponding planar waveguide.

Generally, an optical element is provided, the main component of which is a piece of an optical fibre which in its general configuration can be a substantially conventional type. Thus, the fibre piece has a substantially cylindrical core together with a surrounding substantially cylindrical cladding. Further, a connection is provided to a light source at an end of the fibre piece, so that light emitted from the light source passes through the fibre piece. An output device receives light which has passed through the fibre piece, for providing this light to some other optical device, e.g. a receiving, detecting or evaluating device. In particular, the fibre piece should be multimode type and its connection be made in such a way that when coupled to a light source a multitude of optical modes of light are excited in the fibre piece.

Further, the fibre piece should be designed and in particular its length should be adapted or chosen in such a way, that in the cross section at the end surface of the fibre piece at the output device a mode picture exists, i.e. a light intensity distribution, corresponding to the different modes existing at this end surface, which is a substantially true image or reproduction of the mode picture which exists at the cross section of the input end, and this condition should be fulfilled for at least some frequencies/wavelengths for or for some wavelength interval of the injected light. For example, the mode picture at the cross section at the end surface can be substantially a multiple image of the mode picture existing at the cross section of the input end.

In the preferred case a ring shaped or tubular shaped core is provided in the fibre piece. The exterior and interior diameters of the core are then advantageously selected in such a way that the fibre piece for the considered wavelength range is multimode type in the circumferential direction of the fibre piece in relation to the longitudinal axis thereof. Further, the fibre piece should be type single-mode radially, i.e. in directions extending perpendicularly from the axis of the fibre piece.

Such an optical element can be used as for example a filter or as a sensor or a switch. In the latter case the output device can comprise an optical fibre of single-mode type. The connection and the output devices are designed and the length and shape of the fibre piece in an initial position are adapted in such a way that only light having a wavelength within a definite wavelength interval can be received by the output device. For a change of the length and/or the shape of the fibre piece from its initial state the mode pictures of light having wavelengths within the definite wavelength interval will be changed, so that the light within this interval is received with a modified intensity by the output device. The intensity at the cross section at the output device will in the preferred case be reduced significantly and can in certain cases almost vanish.

When using the optical element as a 1×N-coupler the connection can comprise an optical fibre of single mode type and the output device can comprise N optical fibres of singlemode type, where the cores of the latter ones connect to different positions on the core of the fibre piece in its end surface at the connection. When using it as a 1×2-coupler the output device comprises advantageously two optical D-fibres of type single-mode, the flat surfaces thereof being located facing and contacting each other.

DESCRIPTION OF THE DRAWINGS

The invention will now be described in greater detail by way of non-limiting embodiments with reference to the accompanying drawings, in which:

FIG. 1 is a schematic perspective view of a piece of an optical multimode fibre of standard type, FIG. 2 is a schematic perspective view of a piece of an optical multimode fibre having an annular core, FIG. 3 is a schematic perspective view of a piece of an optical multimode fibre having an annular core coupled to an optical single mode fibre of standard type, FIG. 4 is a partial view of an end surface which shows schematically a light intensity distribution, FIG. 6 shows the fibres of FIG. 5 connected to operate as a sensor, FIG. 7 is a schematic elevational view of a 1×2 coupler built of a multimode fibre and two optical D-fibres of single mode type.

DETAILED DESCRIPTION

Figure 5:
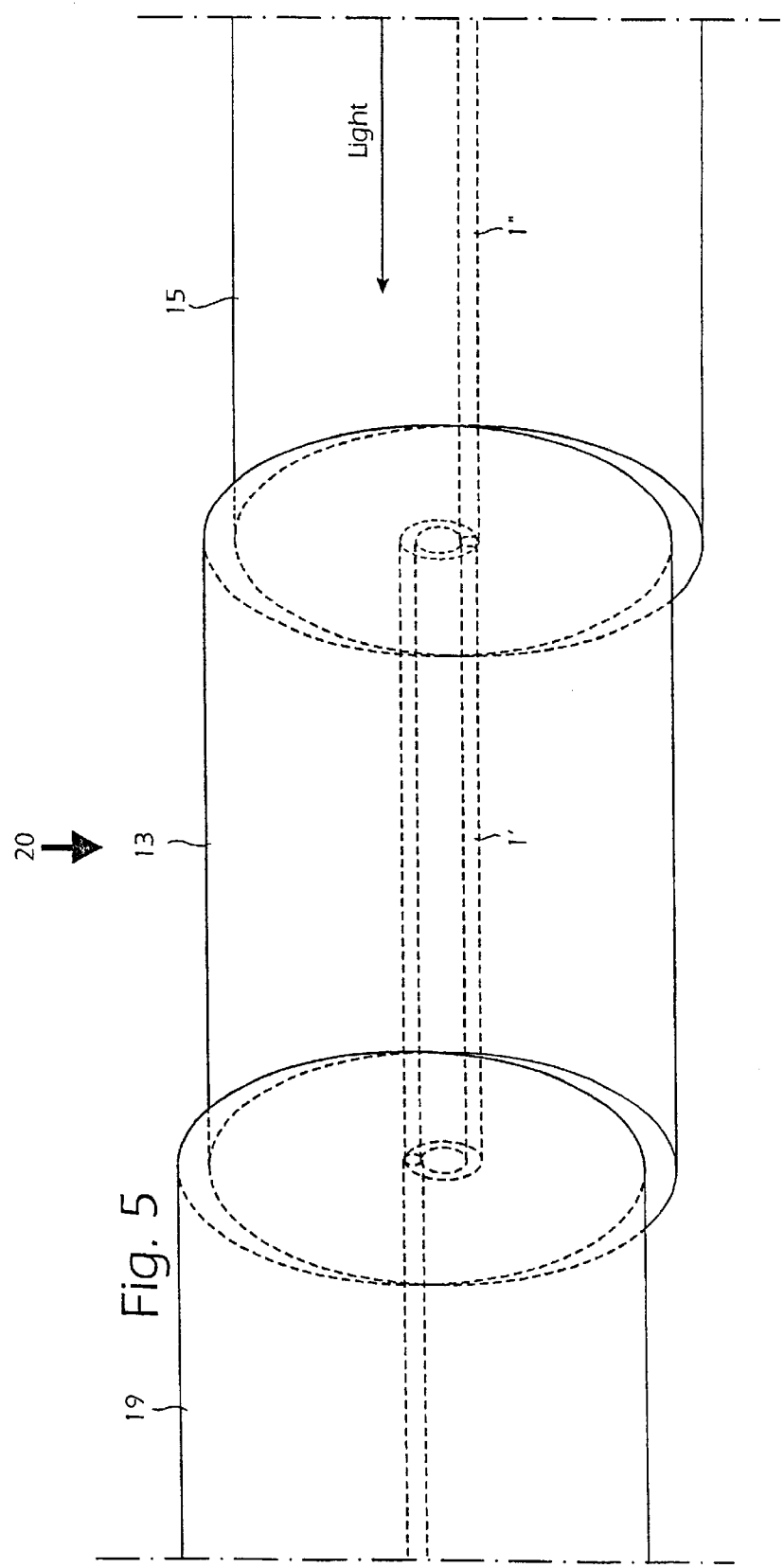
FIG. 5 shows the same view as FIG. 3, where the multimode fibre is coupled to another single mode fibre of standard type.

In FIG. 1 a piece of an optical fibre of multimode type is illustrated. It comprises a centrally located core 1, which generally has cylindrical symmetry and has a diameter of between e.g. about 20 and 100 $\mu$m for common wavelengths used in communication. The core 1 is surrounded by a cladding 3, which has an exterior circular-cylindrical surface and the material of which has a somewhat lower refractive index than that of the core 1.

When injecting light at one end 5 of the fibre piece light waves can propagate along the fibre piece. The particular conditions in the fibre piece which are related to the different limiting surfaces in radial directions, i.e. the variation of the refractive index which exists when passing outwards from the geometric axis of the fibre piece, results in that the light propagates in definite modes. For a suitable wavelength and a suitable design of the fibre piece a multitude of such modes can be excited. The different modes have somewhat different propagation velocities. The general ratios of these propagation velocities in relation to each other can be determined by using the wave equation for suitable boundary conditions. Generally, many densely located optical modes propagate simultaneously in an optical fibre. Thus optical modes are obtained associated both with the radial directions and with the circumferential or azimuthal direction.

One way of reducing the number of possible optical modes is by using another configuration of the core of the optical fibre which limits the number of modes in one of the directions. It is suitably achieved by means of an optical fibre having an annular core as illustrated schematically in FIG. 2. The core 1' in such a fibre can typically have the same exterior diameter as the core of a multimode fibre according to FIG. 1 whereas the interior diameter is selected so that the optical fibre is single mode type radially. The thickness of the cylindrical core 1' is then of the same magnitude of order as the core diameter in single-mode fibre of standard type, of course always considered for some wavelength or some wavelength range. Inside the core 1' a cylindrical interior region is provided which has principally the same refractive index and composition as the region outside the annular core 1'.

As in the planar case comprising a thin waveguide core having a cross section in the shape of an elongated rectangle, see the above cited article by L. B. Soldano et al., it appears that the general ratios of the propagation velocities in relation to each other, the phase velocities, of the different modes generally are approximately regular. Further, this regularity results in that a mode picture, which is injected in the cross section 5, more or less approximatively will appear also in a cross section of the fibre piece at some distance of the first end surface, say at the cross section 7, which in the figures is the other end of the fibre piece. Thus, a light distribution over the cross section is here obtained which is approximately identical to that of the input cross section. In practical cases the waveguide piece illustrated in FIG. 2 has a length of a several centimetres. This figure and also the following ones are not correct in scale and the fibres are illustrated having too large diameters for the sake of clarity.

Further, in the cross section at 9, which is located centrally between the end surfaces 5 and 7 of the fibre piece, a mode picture is obtained which is an approximative mirrored or reflected image of the mode picture at the input end surface 5. The mirroring is made in a plane passing through the longitudinal axis of the fibre piece and which is perpendicular to a symmetry plane of the injected light distribution. In the same way, in cross sections located between the mentioned ones, such as at 11 in FIG. 1, the mode picture can be obtained which is a two-fold image or reproduction of the mode picture at the input end. The position angularly of this two-fold image is also here defined by said symmetry plane of the mode picture at the input surface.

In FIG. 3 a piece 13 of a fibre is illustrated that has an annular core and is coupled to an optical single mode fibre 15 of standard type. Thus, the standard fibre 15 has a core 1" having a small diameter. The standard fibre 15 is coupled to the fibre piece 13 having an annular core, so that the centre of the standard fibre 15 and thus its core 1" connects to or is located opposite to a portion of the annular core 1' in the fibre piece 13. When light propagates in the optical standard fibre 15, the light continues into the fibre piece 13 having an annular core and propagates there along. If the fibre piece 13 has a suitable length thus a mirrored or reflected image of the light intensity at the input surface can be obtained. It is illustrated in the enlarged view of FIG. 4, where a light distribution is schematically indicated as a strongly luminous or bright region 17.

The configuration of FIG. 3 can further be coupled to another optical fibre 19 of single-mode type, as is illustrated in FIG. 5. The coupling is made at a suitable position at the end surface of the fibre piece 13 having an annular core, e.g. in the cross section, where the mode picture is a mirrored image of the mode picture at the input surface. If now light is provided from the first optical fibre 15 of standard type, this light can be emitted further on to the second optical fibre 19 of single-mode type, but only for light of a definite wavelength interval. Thus, the device shown in FIG. 5 has filter characteristics. In order to further reinforce the filtering capability a multitude of fibre pieces 13 having annular cores can be placed a little offset in relation to each other in order to obtain a suitable coupling between the annular cores.

If the fibre piece 13 of FIG. 5 having an annular core is deformed mechanically in some way, e.g. by being subjected to a bending as is illustrated by the arrow 20, this will interfere with the propagation of the optical modes in this fibre piece, and then the communication to the other standard fibre 19 of single-mode type can then be reduced. In this way a sensing operation is achieved. The use of such an arrangement is illustrated in FIG. 6 in a sensor installation. It comprises a light source 21 emitting light of a definite wavelength to the optical single-mode fiber 15. Light from the second single-mode fibre 19 is detected by a photo detector 23. In the case where the fibre piece 13 of multimode type is subjected to some mechanical influence such as a bending, the light transmission can be changed, what is sensed by the detector 23 which then can output an alarm signal.

Figure 8:
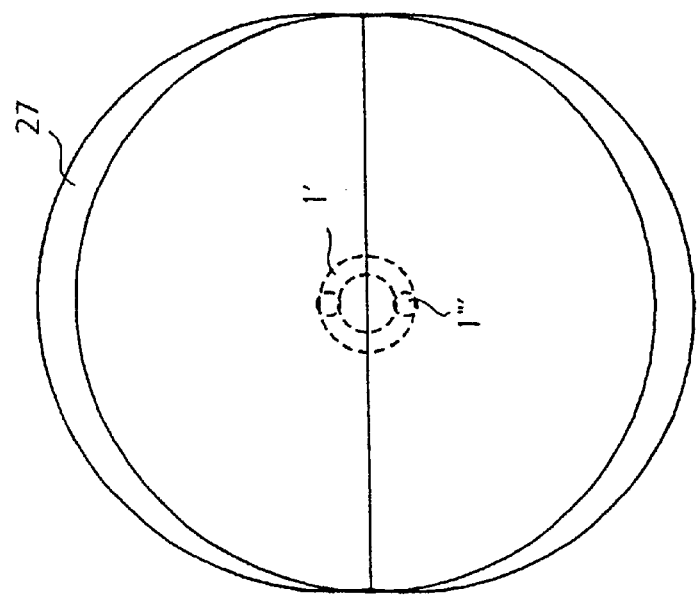
FIG. 8 is a section of the coupler according to FIG. 7

In FIG. 7 a passive 1×2-coupler is illustrated. Here, an optical fibre 15 of single mode type is provided, which as in FIG. 3 and 5 is coupled to a fibre piece 13' having an annular core. The length of the fibre piece 13' is now selected, so that the mode picture at the input surface thereof at the optical fibre 15 provides a two-fold image at the other end surface of the fibre piece 13'. At this end surface two optical D-fibres 27 of single mode type are arranged having their flat surfaces located against each other. The cores of the D-fibres 27 are located at a distance from each other which corresponds to the dimensions of the annular core of the fibre piece 13, so that a coupling of light is obtained from the fibre piece 13' to the two D-fibres 27, see also the sectional view of FIG. 8. Then the core 1'''0 in one of the D-fibres 27 will be located substantially opposite to the core in the optical fibre 15 of single-mode type, from which light is provided. The core of the other D-fibre has a diametrically opposite position, as seen in relation to the fibre piece 13'. The cores 1''' of the D-fibres 27 are thus located opposite regions of the annular core, which opposite regions are located along a diameter of the annular core fibre 13'.

Figure 9:
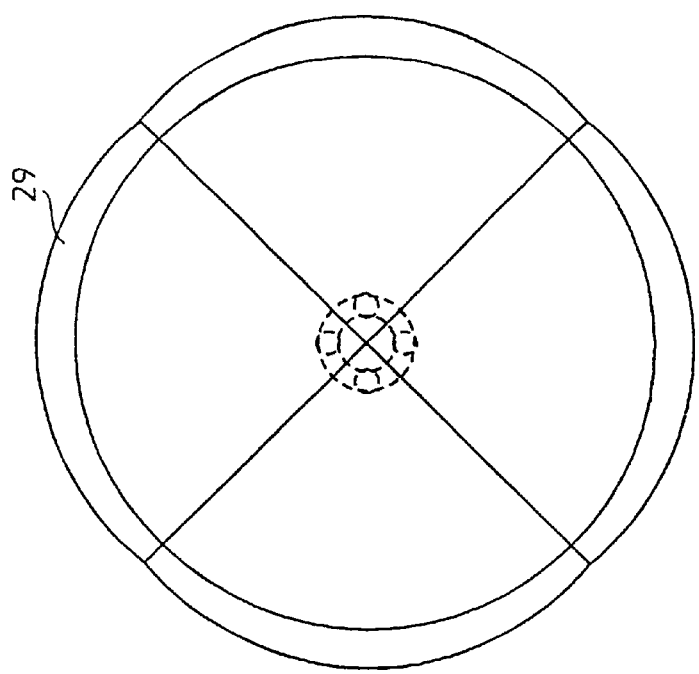
FIG. 9 is a section of a 1×4-coupler.

In the corresponding way a passive 1×4-coupler can be made. Instead of D-fibres 27 fibres 29 are used having cross sections of an approximatively quadrant shape, i.e. which approximatively have the shape of a quarter of a circle, where the core of each such fibre is located close to the point of the quadrant, as is illustrated in FIG. 9.

What is claimed is:

1. An optical element comprising a piece of an optical fiber and a connection to a light source arranged at an input end of the piece of optical fiber so that light emitted from the light source passes through the piece of optical fiber, and further comprising an output device at an output end of the piece of optical fiber for receiving and/or detecting light which has passed through the piece of optical fiber, wherein the piece of optical fiber comprises an annular core and is multimode type in the circular direction, the circular direction being defined by a circle perpendicular to the axis of the piece of optical fiber and the center of the circle being located on the axis, and the fiber piece is single mode type radially, in directions extending perpendicularly from the axis.

2. The optical element of claim 1, wherein the optical element is used as a filter and arranged to be connected to a light source providing light having a multitude of wavelengths to the optical element, and the connection and the output device are arranged and the length of the piece of optical fiber is selected in such a way that light having wavelengths only within a definite wavelength interval can be received by the output device.

3. The optical element of claim 1, wherein the optical element is used as a sensor or a switch, wherein the output device comprises an optical fiber of single mode type, and the connection and the output device are arranged and the length and shape of the piece of optical fiber in an initial state are adapted in such a way that only light having a wavelength within a definite wavelength interval can be received by the output device, whereas for a change of the length and/or the shape of the fiber piece from the initial state, light having a wavelength within the definite wavelength interval is received with a changed intensity by the output device.

4. The optical element of claim 3, wherein the connection and the output device are arranged and the length and shape of the piece of optical fiber in the initial state are adapted in such a way that for a change of the length and/or the shape of the piece of optical fiber from the initial state light having a wavelength within the definite wavelength interval is received with a significantly reduced intensity by the output device.

5. The optical element of claim 1, wherein the optical element is used as a 1×N-coupler, the connection comprises a first optical fiber of single mode type having a core and the output device comprises at least one second optical fiber of single mode type having a core, the core of the first optical fiber of single mode type connecting to a first position on the annular core of the piece of optical fiber exposed at an end surface cross section of the input end and the core of the at least one second optical fiber of single mode type connecting to a second position on the annular core of the piece of optical fiber exposed at an end surface cross section of the output end, the first and second positions being different from each other taken in an axial direction of the piece of optical fiber.

6. The optical element of claim 5, wherein the optical element is used as an 1×2 coupler, and the output device comprises two optical D-fibers of single mode type.

7. An optical element comprising a piece of an optical fiber including a substantially circular-cylindrical core and a surrounding, substantially circular-cylindrical cladding, the piece of optical fiber having at an input end a connector to a light source arranged so that light emitted from the light source passes through the piece of optical fiber, and further having at an output end an output device for receiving light, which has passed through the piece of optical fiber, in order to be provided to an optical device;

wherein the piece of optical fiber is multimode type, and the connection is made in such a way that when connecting to a light source, a multimode of optical modes of light are excited in the piece of optical fiber;

the length of the piece of optical fiber is selected in such a way that, when connecting to a light source, at an end surface cross section at the output end, a mode picture exits which at least for some frequency of light provided from the light source substantially is an image of a mode picture existing at an end surface cross section at the input end;

the optical element is used as a 1×N couple;

the connection comprises a first optical fiber of single mode type having a core; and the output device comprises at least one second optical fiber of single mode type having a core, the core of the first optical fiber of single mode type connecting to a first position on the core of the piece of optical fiber exposed at an end surface cross section of the input end and the core of the at least one second optical fiber of single mode type connecting to a second position on the core of the piece of optical fiber exposed at an end surface cross section of the output end, the first and second positions being different from each other taken in an axial direction of the piece of optical fiber.

8. The optical element of claim 7, wherein the output device comprises two optical D-fibers of single mode type.

9. An optical sensor or switch element comprising a piece of an optical fiber and a connection to a light source arranged at an input end of the piece of optical fiber so that light emitted from the light source passes through the piece of optical fiber, and further comprising an output device at an output end of the piece of optical fiber for receiving and/or detecting light which has passed through the piece of optical fiber, wherein the piece of optical fiber is multimode type and has an annular core, the output device comprises an optical fiber of single mode type and the connection and the output device are arranged and the length and shape of the piece of optical fiber in an initial state are adapted in such a way that only light having a wavelength within a definite wavelength interval can be received by the output device, whereas for a change of the length and/or the shape of the fiber piece from the initial state light having a wavelength within the definite wavelength interval is received with a changed intensity by the output device.

10. The optical sensor or switch element of claim 9, wherein the connection and the output device are arranged and the length and shape of the piece of optical fiber in the initial state are adapted in such a way that for a change of the length and/or the shape of the piece of optical fiber from the initial state light having a wavelength within the definite wavelength interval is received with a significantly reduced intensity by the output device.

11. An optical 1×N-coupler element comprising a piece of an optical fiber and a connection to a light source arranged at an input end of the piece of optical fiber so that light emitted from the light source passes through the piece of optical fiber, and further comprising an output device at an output end of the piece of optical fiber for receiving and/or detecting light which has passed through the piece of optical fiber, wherein the piece of optical fiber is multimode type and has an annular core, the connection comprises a first optical fiber of single mode type having a core, and the output device comprises at least one second optical fiber of single mode type having a core, the core of the first optical fiber of single mode type connecting to a first position on the annular core of the piece of optical fiber exposed at an end surface cross section of the input end and the core of the at least one second optical fiber of single mode type connecting to a second position on the annular core of the piece of optical fiber exposed at an end surface cross section of the output end, the first and second positions being different from each other taken in an axial direction of the piece of optical fiber.

12. The optical 1×N-coupler element of claim 11, wherein the output device comprises two optical D-fibers of single mode type.

* * * * *